United States Patent [19]

Egri II

[11] Patent Number: 4,857,085

[45] Date of Patent: Aug. 15, 1989

[54] PROCESS FOR ABATEMENT OF ASBESTOS FIBERS

[76] Inventor: John D. Egri II, 5200 Moore Rd., Lincoln, Calif. 95648

[21] Appl. No.: 196,669

[22] Filed: May 20, 1988

[51] Int. Cl.[4] .................. B01D 49/00

[52] U.S. Cl. .................. 55/83; 55/87; 264/82; 427/255.6

[58] Field of Search .................. 55/1, 83, 87, 257.2; 264/82; 427/237, 255.6, 398.1

[56] References Cited

U.S. PATENT DOCUMENTS

| | | | |
|---|---|---|---|
| 301,617 | 7/1884 | McCandliss | 264/82 |
| 346,736 | 8/1886 | Daniels | 264/82 |
| 3,429,848 | 2/1969 | Robins | 427/255.6 X |
| 3,574,784 | 4/1971 | Litt et al. | 427/398.1 |
| 3,822,226 | 7/1974 | Taft et al. | 427/255.6 X |
| 4,289,509 | 9/1981 | Hölter | 55/257.2 |
| 4,316,514 | 2/1982 | Jysky | 55/1 X |
| 4,351,567 | 9/1982 | Gillingham | 55/257.2 X |
| 4,380,459 | 4/1983 | Netting | 55/87 |
| 4,561,905 | 12/1985 | Kittle | 55/87 X |

FOREIGN PATENT DOCUMENTS

| | | | |
|---|---|---|---|
| 1522723 | 4/1968 | France | 427/255.6 |
| 5436 | 1/1974 | Japan | 427/255.6 |
| 7168 | 3/1976 | Japan | 427/255.6 |
| 511599 | 8/1939 | United Kingdom | 55/83 |

OTHER PUBLICATIONS

Odencrantz et al., "Ice Whiskers & Dendrites in a Cloud Chamber Replicated with Methyl 2-Cyanoacrylate", J. of Crystal Growth 8 No. 2, (1971), 141-148.

*Primary Examiner*—Robert Spitzer
*Attorney, Agent, or Firm*—Leon Gilden

[57] ABSTRACT

A treatment area, such as a room, is sealed off from air flow communication with an outside environment whereupon cyanoacrylate is vaporized and fumed through a heating medium at a prescribed temperature throughout the treatment area. Upon cooling of the cyanoacrylate, asbestos is encapsulated within the cyanoacrylate within a thin film to simultaneously seal the treatment area and assist in removal of airborne asbestos fibers.

6 Claims, 2 Drawing Sheets

PROCESS FOR ABATEMENT OF ASBESTOS FIBERS

BACKGROUND OF THE INVENTION

1. Field of the Invention

The field of invention relates to asbestos treatment, and more particularly pertains to a new and improved process for abatement of asbestos fibers by vaporizing cyanoacrylate and encapsulating asbestos fibers present in the treatment area.

2. Description of the Prior Art

The treatment of asbestos contamination throughout contemporary construction is well known in the prior art. It is now desirable in pre-existing structures to remove and eliminate asbestos from living and working areas due to the inherent medical problems associated with the asbestos fibers. Prior art devices have utilized various approaches towards filtering and removal of airborne contaminants with limited application and limited associated results. For example, U.S. Pat. No. 4,289,509 to Holter sets forth a dust aspirating arrangement in use in underground applications wherein a suction element is arranged for receiving dust contaminated air and removing same by use of a moisturizing element arranged for moisturizing the air and enabling precipitation in such air thereby. The Holter patent, while useful in the particular and limited environment of underground applications, is of limiting usefulness in the removal of contaminant asbestos fiber present in contemporary construction.

U.S. Pat. No. 4,380,459 to Netting sets forth a coal dust removal process wherein an aqueous foam is of controlled penetrability wherein small particles within the air are captured by the foam and drained into a liquid resulting from collapse of the foam. The complex administration and limited application of the Netting patent renders the process somewhat remote from the approach and results utilized by the instant invention.

U.S. Pat. No. 4,561,905 to Kittle sets forth a further coal dust suppressing procedure wherein foaming of a water diluted emulsion, including a surfactant and an oil exhibiting a tacky characteristic when in the form of a film, is utilized to suppress coal dust within a desired environment.

U.S. Pat. No. 4,351,567 to Gillingham sets forth a scrubber for removing dust generated by a shearing arrangement wherein an inlet is provided in a housing proximate an associated cutting drum where an arrangement of jet spray nozzles impart high velocities of small diameter water droplets to entrain dust particles in the air and eliminate same from a desired environment.

U.S. Pat. No. 4,316,514 to Jysky sets forth a method for binding dust generated within a rock drilling arrangement wherein a liquid binder is applied to a mixing chamber in a manner appropriate for mixing dust and liquid to remove same from a desired environment. This patent, as well as the other prior art of record while of value in discrete and narrow applications, is of limited utility in the need for an effective and useful asbestos abatement procedure.

As such, it may be appreciated that there is a continuing need for a new and improved process for abatement of asbestos fibers which addresses both the problem of effectiveness and ease of use, and in this respect the present invention substantially fulfills this need.

SUMMARY OF THE INVENTION

In view of the foregoing disadvantages inherent in the known types of asbestos fiber abatement procedures now present in the prior art, the present invention provides a process for abatement of asbestos fibers wherein the same may be effectively and efficiently applied within a sealed treatment area and may be further effectively repeated, as desired. As such, the general purpose of the present invention, which will be described subsequently in greater detail, is to provide a new and improved process for abatement of asbestos fibers which has all the advantages of the prior art abatement of airborne contaminants and none of the disadvantages.

To attain this, the present invention comprises the steps of sealing a room from airborne communication with areas outside the room and thereafter providing a heating source to heat a container to approximately 100 degrees C. Thereafter, cyanoacrylate is positioned within the container and vaporized to provide a fuming of the sealed treatment area. Subsequent to cooling of the vaporized cyanoacrylate, the room is opened to use wherein the asbestos fibers within the room are encapsulated.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved process for abatement of asbestos fibers which has all the advantages of the prior art processes for abatement of asbestos fibers and none of the disadvantages.

It is another object of the present invention to provide a new and improved process for abatement of asbestos fibers which may be easily and efficiently manufactured and marketed.

It is a further object of the present invention to provide a new and improved process for abatement of asbestos fibers which is of a durable and reliable construction.

An even further object of the present invention is to provide a new and improved process for abatement of asbestos fibers which is susceptible of a low cost of manufacture with regard to both materials and labor, and which accordingly is then susceptible of low prices of sale to the consuming public, thereby making such process for abatement of asbestos fibers economically available to the buying public.

Still yet another object of the present invention is to provide a new and improved process for abatement of asbestos fibers which provides in the apparatuses and methods of the prior art some of the advantages thereof, while simultaneously overcoming some of the disadvantages normally associated therewith.

Still another object of the present invention is to provide a new and improved process for abatement of asbestos fibers wherein fuming of cyanoacrylate within a confined treatment area encapsulates and captures asbestos fibers within that treatment area.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
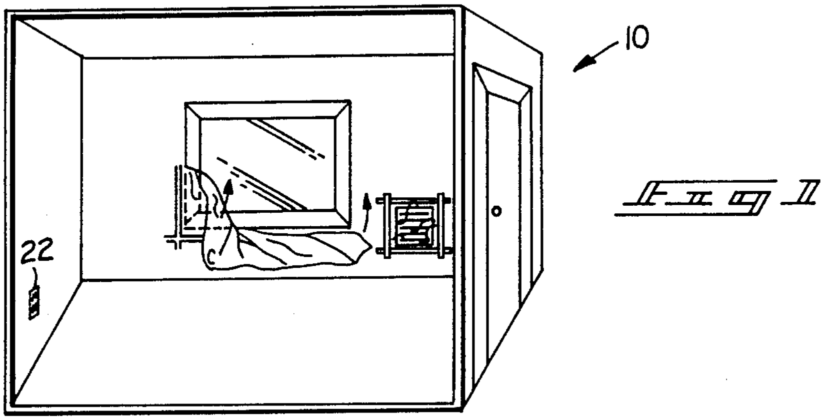
FIG. 1 is an isometric illustration of a first step of the instant invention illustrating the sealing of a typical room to be treated.

With reference now to the drawings, and in particular to FIGS. 1 to 6 thereof, a new and improved process for abatement of asbestos fibers embodying the principles and concepts of the present invention and generally designated by the reference numeral 10 through 15 will be described.

More specifically, it will be noted that the process for abatement of asbestos fibers essentially comprises a heating of cyanoacrylate to volatility wherein a fuming of the cyanoacrylate is effected. The fuming of the chemical effects a bonding and encapsulating of the asbestos fibers within a finite area, such as a room to be treated. It should be noted that cyanoacrylate is available under commercial names such as "ZapaGap" (T.M.) by Pacer Tech. or "ScotchWeld" by 3M Corporation. While a physical heating of the cyanoacrylate is set forth, it may be noted that a chemical catalyst may be employed but the use of physical heating will be more specifically described.

Figure 2:
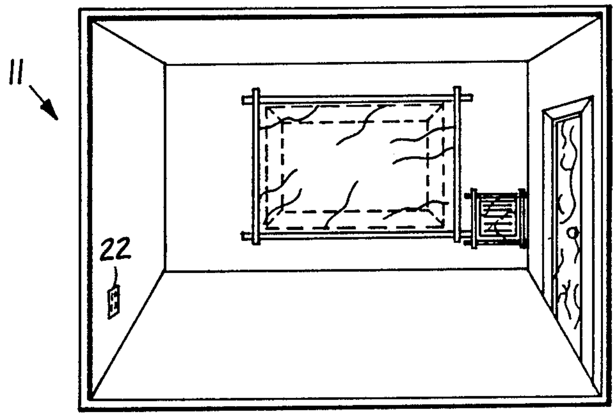
FIG. 2 is an isometric illustration of a second step of the instant invention illustration further sealing of the room.
Figure 3:
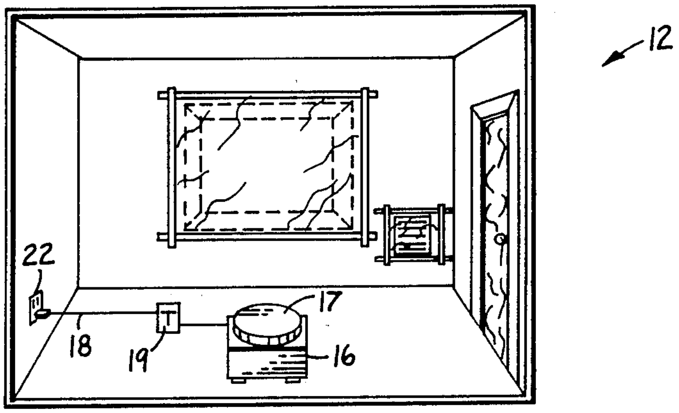
FIG. 3 is an isometric illustration of a further step of the instant invention illustrating a heating medium positioned within the room.
Figure 4:
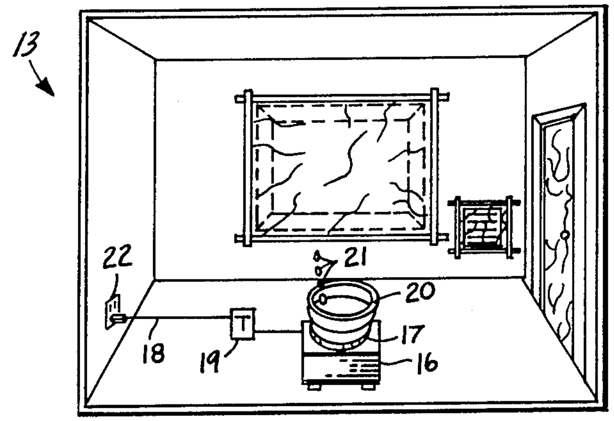
FIG. 4 is a further isometric illustration setting forth a further step of the procedure wherein a container is positioned on the heating medium for acceptance of cyanoacrylate.

FIG. 1, as illustrated and depicted by numeral 10, sets forth a first step of the invention where predetermined surfaces of a treatment zone, or room, is sealed with a plasticlike film or other suitable non-porous material to cover items such as window openings, interior door sills, electrical fixtures, air ventilation face plates, and the like. FIG. 2 illustrates an interior surface of the room wherein the various portions thereof not to be coated by the fuming of the cyanoacrylate is illustrated and depicted by numeral 11. Numeral 12 per FIG. 3 illustrates a subsequent step of positioning a portable heating unit 16 within the interior of the room to be treated with an associated electrical resistance heating element 17 and electrical cord 18. A timer unit 19 of conventional and commercial availability is utilized to enable a user to leave the treatment area prior to heating of the cyanoacrylate. Subsequent to the heating unit 16 being electrically associated with an appropriate electrical outlet 22, a container 20, as illustrated in FIG. 4 and depicted by numeral 13, is positioned on the electrical resistance heating element 17. Thereafter, liquid cyanoacrylate is deposited within the container 20. It has been found desirable to utilize approximately 1 to 2 drops of cyanoacrylate 21 deposited within container 20 per liter of volume of the treatment area, or room as illustrated.

The cyanoacrylate is heated to an elevated temperature to effect vaporization where it has been found that temperature to exceed 80 degrees C. has been found suitable with 100 degrees C. heating desirable.

Figure 5:
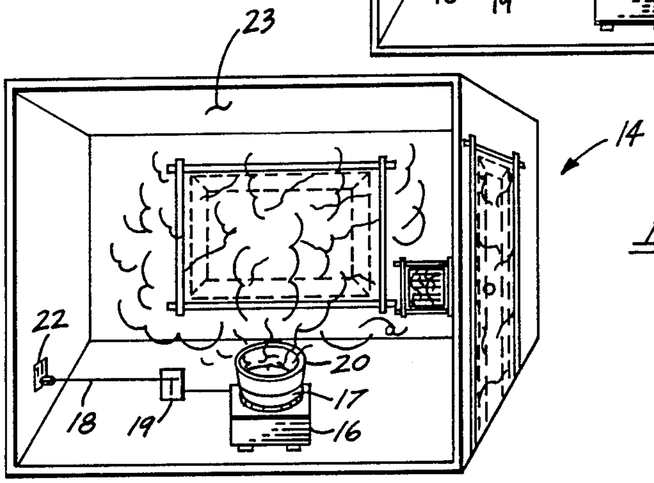
FIG. 5 is an isometric illustration of the instant invention illustrating the fuming of the cyanoacrylate within the room.

FIG. 5 illustrates the fuming of the liquid cyanoacrylate to create a vaporous fuming 23 wherein the interior walls of the area to be treated are thereby coated and accordingly entrap and encapsulate asbestos fibers and seal the walls against asbestos fibers within the treatment area. It should be understood, however, should physical destruction of the seal of cyanoacrylate take place subsequent to treatment, a resealing and retreatment of the room may be deemed desirable. Fuming of the cyanoacrylate tends to encapsulate airborne asbestos fibers within the room to effect their removal therefrom.

Figure 6:
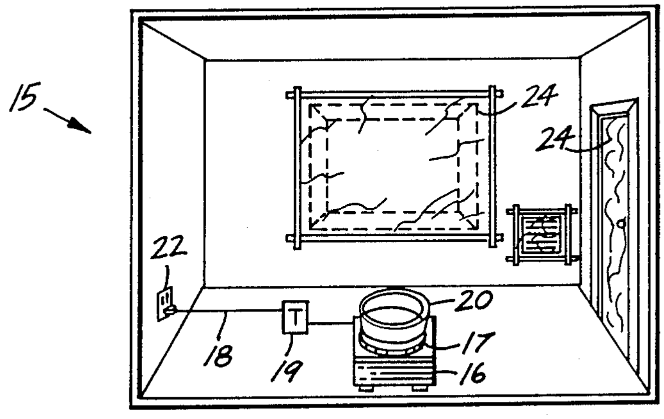
FIG. 6 is yet another isometric illustration of the instant invention wherein the cyanoacrylate is cooled and adhering to the surfaces of the room to be treated.

FIG. 6 is illustrative of the treatment area subsequent to fuming wherein the cyanoacrylate has been given ample time to dry where it has been deemed desirable to allow at least ten minutes to an hour to effect drying as cyanoacrylate vapors dry very rapidly, but due to their potentially harmful effects upon humans, it is desirable to allow adequate time for the drying procedure to take place whereupon removal of the sealing medium, depicted as numerals 24, may then be removed.

The manner of usage and operation of the instant invention therefore should be apparent from the above description and accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A method of asbestos fiber abatement by application of gaseous cyanoacrylate comprising the steps of, a. selecting a treatment area to define an enclosure, and b. applying a first sealing means to seal selected interior components of said enclosure to prevent contact by said gaseous cyanoacrylate, and c. positioning a heating means within said enclosure and positioning liquid cyanoacrylate in heating communication with said heating means, and d. applying a second sealing means to seal exterior portions of said enclosure to prevent said gaseous cyanoacrylate from escaping from within said enclosure, and e. heating said cyanoacrylate to a gaseous state, and f. allowing passage of sufficient time to enable said gaseous cyanoacrylate to solidity, and g. removing said first and second sealing means.

2. A method of asbestos fiber abatement as set forth in claim 1 wherein the step of applying a first sealing means includes utilizing a non-porous sealing means to overlie said interior components.

3. A method of asbestos fiber abatement as set forth in claim 2 wherein the step of positioning a heating means further includes utilizing a heating means with a heating element wherein said heating means is provided with a timer mechanism to enable presetting when said heating of said cyanoacrylate commences.

4. A method of asbestos fiber abatement as set forth in claim 3 wherein said cyanoacrylate is heated at an elevated temperature above 80 degrees C.

5. A method of asbestos fiber abatement as set forth in claim 4 wherein said cyanoacrylate is heated to approximately 100 degrees C.

6. A method of asbestos fiber abatement as set forth in claim 5 wherein the step of applying said second sealing means includes utilizing a non-porous sealing material to seal exterior openings communicating from interiorly of said enclosure to areas exteriorly of said enclosure.

* * * * *